(12) United States Patent
Wallace

(10) Patent No.: US 11,662,778 B2
(45) Date of Patent: May 30, 2023

(54) KEYBOARD DOCK

(71) Applicant: LENOVO (SINGAPORE) PTE. LTD, Singapore (SG)

(72) Inventor: Brian William Wallace, Raleigh, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 0 days.

(21) Appl. No.: 17/491,894

(22) Filed: Oct. 1, 2021

(65) Prior Publication Data

US 2023/0106903 A1 Apr. 6, 2023

(51) Int. Cl.
*G06F 1/16* (2006.01)
*H01R 13/62* (2006.01)
*G06F 3/02* (2006.01)
*G06F 3/023* (2006.01)
*G06F 3/0362* (2013.01)

(52) U.S. Cl.
CPC .......... *G06F 1/1669* (2013.01); *G06F 1/1632* (2013.01); *G06F 1/1654* (2013.01); *G06F 3/0202* (2013.01); *G06F 3/0231* (2013.01); *G06F 3/0362* (2013.01); *H01R 13/6205* (2013.01)

(58) Field of Classification Search
CPC ...... G06F 1/1632; G06F 1/1669; G06F 1/266; G06F 3/0231; G06F 3/0221; G06F 3/021; G06F 3/02; G06F 3/0202; G06F 1/1654; G06F 1/1626; G06F 1/1628; G06F 1/1667; G06F 1/1637; G06F 1/1633; H01R 13/6205; H01R 13/60; H01R 13/6675
See application file for complete search history.

(56) References Cited

U.S. PATENT DOCUMENTS

| | | | | |
|---|---|---|---|---|
| 9,122,448 B2 * | 9/2015 | Gao | ...................... | G06F 3/0202 |
| 9,167,711 B2 * | 10/2015 | Lee | ....................... | G06F 1/1626 |
| 9,465,409 B2 * | 10/2016 | Wu | ......................... | G06F 1/1681 |
| 9,766,661 B2 * | 9/2017 | Hui | ....................... | G06F 1/1654 |
| 10,015,572 B2 * | 7/2018 | Fontana | ................ | G06F 1/1632 |
| 10,615,538 B2 * | 4/2020 | Cho | ........................ | G06F 1/1656 |
| 11,068,028 B1 * | 7/2021 | Cubrilovic | .......... | F21V 33/0052 |
| 11,144,092 B2 * | 10/2021 | Hewett | ................. | G06F 1/1681 |
| 2010/0238620 A1 * | 9/2010 | Fish | ....................... | G06F 1/1654 |
| | | | | 361/679.29 |
| 2012/0170204 A1 * | 7/2012 | Ahn | ...................... | G06F 1/1616 |
| | | | | 361/679.41 |
| 2013/0279100 A1 * | 10/2013 | Fontana | ................ | G06F 1/1628 |
| | | | | 361/679.2 |
| 2013/0335914 A1 * | 12/2013 | Lee | ....................... | G06F 1/1654 |
| | | | | 361/679.41 |
| 2014/0313665 A1 * | 10/2014 | Delpier | ................. | G06F 1/1679 |
| | | | | 361/679.55 |
| 2015/0011165 A1 * | 1/2015 | Shinkawa | ............ | H04B 1/3888 |
| | | | | 455/90.3 |
| 2015/0198980 A1 * | 7/2015 | Aoki | ..................... | G06F 1/1654 |
| | | | | 361/679.17 |
| 2016/0173142 A1 * | 6/2016 | Chen | .................. | H04L 25/0272 |
| | | | | 455/114.2 |

(Continued)

*Primary Examiner* — Dismery Mercedes
(74) *Attorney, Agent, or Firm* — Brian J. Pangrle

(57) ABSTRACT

A keyboard dock can include a keyboard coupling; a front surface; and a front spacer that extends outwardly from the front surface, where the front spacer and the front surface form a mobile device support.

18 Claims, 12 Drawing Sheets

(56) References Cited

U.S. PATENT DOCUMENTS

| | | | |
|---|---|---|---|
| 2016/0179142 A1* | 6/2016 | Liang | G06F 1/1669 |
| | | | 361/679.17 |
| 2017/0060186 A1* | 3/2017 | Eliyahu | G06F 1/1632 |
| 2017/0090516 A1* | 3/2017 | Ku | H02J 7/0042 |
| 2018/0309232 A1* | 10/2018 | Cho | G06F 1/1656 |
| 2018/0373294 A1* | 12/2018 | Perelli | G06F 1/1688 |

* cited by examiner

KEYBOARD DOCK

TECHNICAL FIELD

Subject matter disclosed herein generally relates to keyboards for computing and display devices.

BACKGROUND

A system can include a display assembly with a display and a keyboard that can receive input.

SUMMARY

A keyboard dock can include a keyboard coupling; a front surface; and a front spacer that extends outwardly from the front surface, where the front spacer and the front surface form a mobile device support. An assembly can include a keyboard dock that includes a keyboard unit coupling, a front surface, and a front spacer that extends outwardly from the front surface; and a keyboard unit that includes a keyboard dock coupling and a back surface, where the keyboard unit coupling detachably mates with the keyboard dock coupling to form a mobile device slot defined by the front spacer and the front surface of the keyboard dock and the back surface of the keyboard unit. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
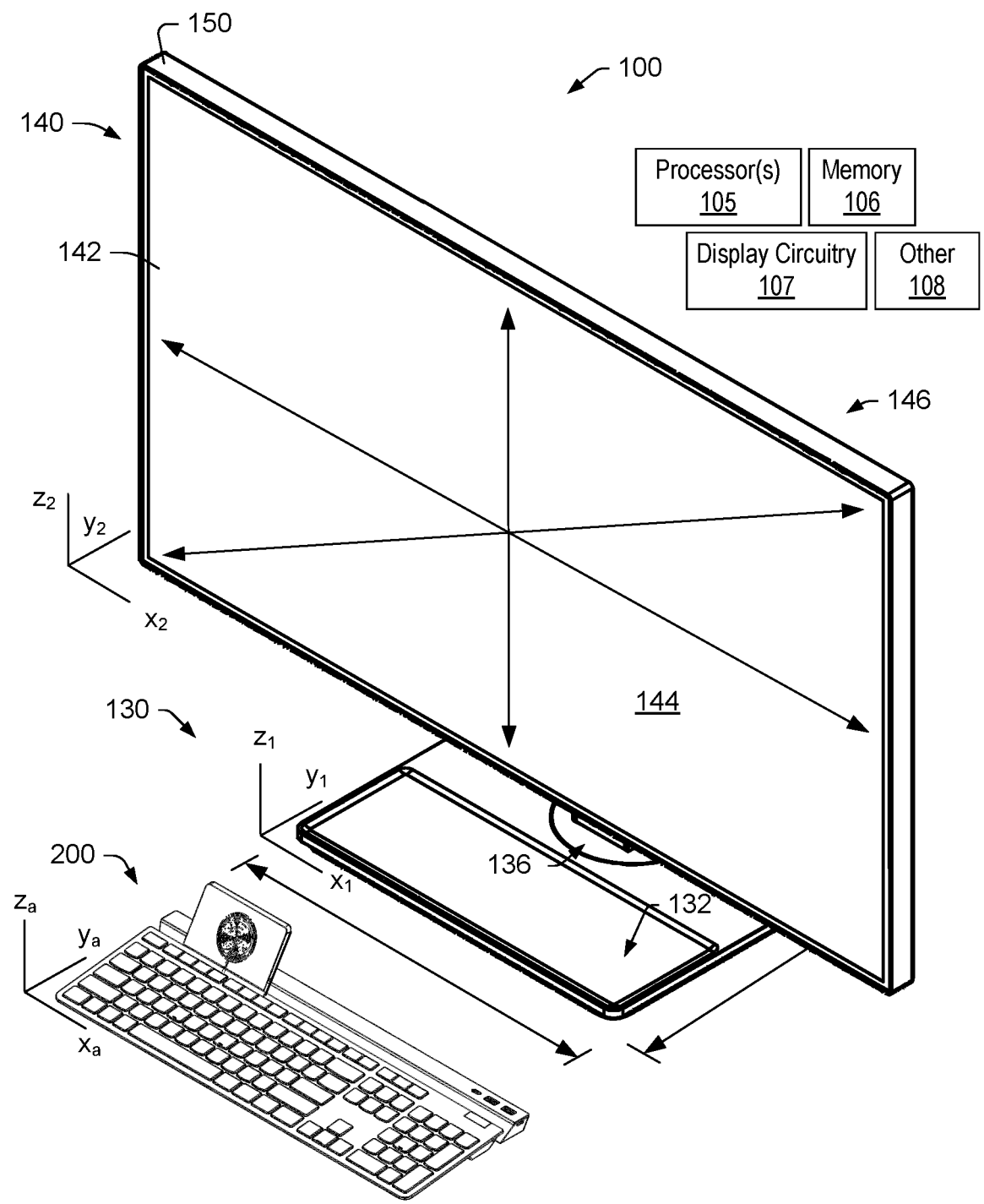
FIG. 1 is a perspective view of an example of a system with an example of a keyboard assembly.

FIG. 1 shows a perspective view of an example of a system 100 that can include one or more processors 105, memory 106 accessible to at least one of the one or more processors 105, display circuitry 107 and one or more other components 108, which can include electronic circuitry, instructions stored in the memory 106 and executable by at least one of the one or more processors 105, etc. As an example, the system 100 may include one or more accessories, peripherals, etc.

In the example of FIG. 1, the system 100 includes an example of a keyboard assembly 200 that may be operatively coupled to at least one of the one or more processors 105 (e.g., via wire, via wireless communication circuitry, etc.).

As shown in FIG. 1, the system 100 includes a display assembly 140 with a display 142 that may utilize one or more technologies (e.g., LED, LCD, etc.). The display assembly 140 can include a display side 144, a back side 146 and a frame 150. The display circuitry 107 can be operatively coupled to at least one of the one or more processors 105, for example, to receive data, instructions, etc., for rendering text, graphics, images, etc., to the display side 144 of the display 142.

As an example, the display circuitry 107 can include one or more graphics processing units (GPUs) and, for example, one or more of the one or more processors 105 can be a central processing unit (CPU). As an example, the display circuitry 107 can include input circuitry such as touch circuitry, digitizer circuitry, etc., such that the display side 144 is an input surface. For example, the display side 144 may receive input via touch, a stylus, etc. As an example, the display assembly 140 can include a touchscreen display where a finger, a stylus, etc., can be utilized; noting sensing as to input may occur with or without physical contact between a finger and the display side 144, between a stylus and the display side 144, etc., depending on the type of input circuitry utilized (e.g., resistive, capacitive, acoustic wave, infrared, optical, dispersive signal, etc.).

In the example of FIG. 1, the system 100 can include a base 130 that includes an upper surface 132 and an arm 136 that is operatively coupled to the display assembly 140. For example, the arm 136 can extend from the base 130 where the display assembly 140 includes an arm mount that couples the arm 136 to the display assembly 140, for example, on the back side 146 of the display assembly 140 that is opposite the display side 144 of the display assembly 140. As an example, the base 130 and the arm 136 can be a stand for the display assembly 140.

As shown in the example of FIG. 1, the display side 144 may be centered along a centerline of the system 100 and may be disposed at an angle that can be defined by the base 130 or a flat support surface such as a desktop, a tabletop, a countertop, etc., where the base 130 or the flat support surface can be planar and horizontal. As shown, the arm 136 rises from the base 130 at an angle that may be normal to the base 130 or the flat support surface (e.g., a 90 degree angle). As to an angle of the display side 144, it may be 90 degrees, greater than 90 degrees or less than 90 degrees.

As shown, the base 130 and the display assembly 140 and/or the display side 144 can be defined with respect to one or more coordinate systems such as, for example, one or more Cartesian coordinate systems (see, e.g., $x_1$, $y_1$, $z_1$ and $x_2$, $y_2$, $z_2$). As shown, the display side 144 can be defined by a display area, which may be two-dimensional for a substantially flat (e.g., planar) display surface or which may be three-dimensional for a curved display surface, noting that such a curve may be of a relatively large radius of curvature (e.g., 50 cm or more) that gives the display a gentle curve (e.g., consider a radius of approximately the length of an extended arm of a user as traced by movement left and right from a shoulder of a user positioned in front of the display surface by an ergonomic distance). As shown, the arm 136 of the base 130 can be utilized to provide a gap or clearance between a lower edge of the display assembly 140 and a support surface on which the base 130 is supported (e.g., a desktop, tabletop, countertop, etc.). Such a gap may provide for rotation of the display 142 (e.g., from a landscape orientation to a portrait orientation).

As an example, the base 130 can include a platform, for example, defined in part by the upper surface 132, which may be a keyboard assembly platform that can be utilized for placement of the keyboard assembly 200. For example, consider storing the keyboard assembly 200 on the base 130 where a gap between the upper surface 132 and the display assembly 140 can accommodate the keyboard assembly 200. In the example of FIG. 1, the upper surface 132 may be recessed, include a raised border, be disposed at a slight angle (e.g., less than approximately 30 degrees), include wireless charging circuitry that may provide for charging a battery of the keyboard assembly 200, etc.

In the example of FIG. 1, the keyboard assembly 200 is illustrated along with a Cartesian coordinate system with $x_a$, $y_a$ and $z_a$ coordinates that may be utilized to describe one or more features of the keyboard assembly 200. As shown, the coordinate $x_a$ can define a length (side to side), the coordinate $y_a$ can define a depth (front to back) and the coordinate $z_a$ can define a height (bottom to top). As shown, the upper surface 132 of the base 130 may be defined where the coordinate $x_1$ defines a length, the coordinate $y_1$ defines a depth and the coordinate $z_1$ defines a height. As an example, an area or footprint of the keyboard assembly 200 may be less than or equal to an area or footprint of the upper surface 132 of the base 130. Where the upper surface 132 includes a raised border or is recessed, the keyboard assembly or a portion thereof may be of an area that is less than an area of the upper surface 132.

As mentioned, the base 130 may include charging circuitry where, for example, when the keyboard assembly 200 is positioned on the base 130, one or more rechargeable batteries of the keyboard assembly 200 may be charged (e.g., via a contact and/or contactless interface, which may be a wireless interface). A wireless interface may include one or more features of the Qi standard.

Components that operate with the Qi standard utilize electromagnetic induction between coils. For example, a wireless charging system can include a base station that is connected to a power source for providing inductive power and a positionable device or assembly that can consume the provided inductive power. A base station can include a power transmitter that includes a transmitter coil that generates an oscillating magnetic field and the positionable device or assembly can include a power receiver that includes a receiver coil. In such an arrangement, a magnetic field can induce an alternating current in the receiver coil via Faraday's law of induction. To make transfer or power more efficient, a system can provide for close spacing of coils, shielding on their surfaces, etc.

Figure 2:
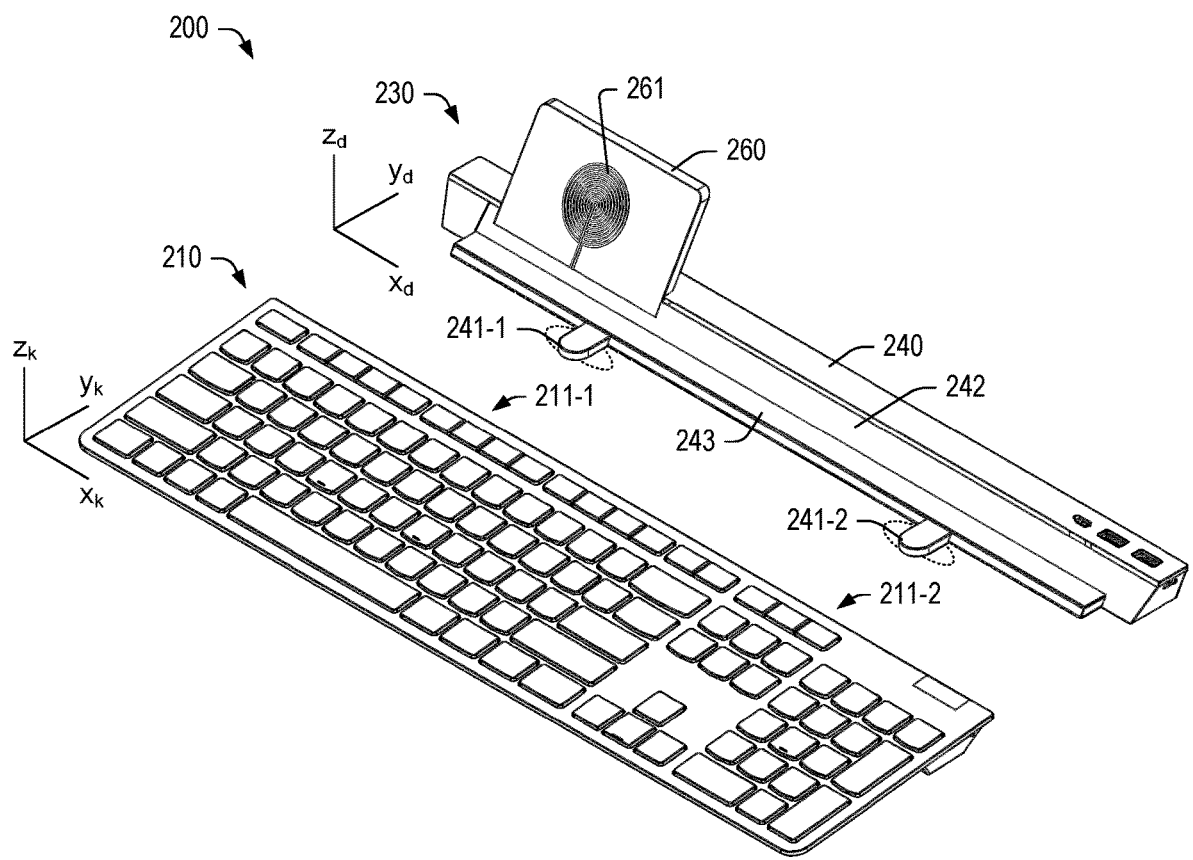
FIG. 2 is an exploded perspective view of the keyboard assembly of FIG. 1.

FIG. 2 shows an exploded perspective view of an example of the keyboard assembly 200 of FIG. 1. As shown, the keyboard assembly 200 can include a keyboard unit 210 and a keyboard dock 230. Various features of the keyboard unit 210 can be defined with respect to a Cartesian coordinate system with coordinates $x_k$, $y_k$ and $z_k$ and various features of the keyboard dock 230 can be defined with respect to a Cartesian coordinate system with coordinates $x_d$, $y_d$ and $z_d$, where, once coupled together, the coordinates $x_a$, $y_a$ and $z_a$ may be utilized (see, e.g., FIG. 1).

As shown in the example of FIG. 2, the keyboard dock 230 can include a housing 240, one or more keyboard couplings 241-1 and 241-2, a front surface 242 and a front spacer 243 that extends outwardly from the front surface 242, where the front spacer 243 and the front surface 242 can form a mobile device support.

As an example, the front surface 242 can be a front surface of the housing 240. As an example, the front surface 242 may be sloped, for example, sloped backward from a front edge to a back edge at an angle greater than 90 degrees with respect to horizontal (e.g., a tabletop, a desktop, a platform, etc.). As an example, the front spacer 243 may include a contiguous surface or may include a plurality of surfaces where such surface or surfaces may be horizontal (e.g., flat at 0 degrees) or sloped, for example, sloping downward from front to back (e.g., a front edge or edges to a back edge or edges).

In the example of FIG. 2, the keyboard dock 230 includes a charger extension 260 that includes a coil 261, which may be a transmitter coil with one or more features specified according to the Qi standard. The coil 261 may be suitable for use with a receiver coil such as, for example, a receiver coil of a mobile device such as a cellular phone, a peripheral, etc.

In the example of FIG. 2, the keyboard unit 210 can include one or more keyboard dock couplings 211-1 and 211-2 that can connect the keyboard unit 210 and the keyboard dock 230 via the one or more keyboard couplings 241-1 and 241-2. As an example, the couplings 241-1, 241-2, 211-1 and 211-2 can include one or more magnets. For example, consider the couplings 241-1 and 241-2 as including magnets and the couplings 211-1 and 211-2 as including ferromagnetic material (e.g., iron, etc.), or vice versa, such that connection is via a magnetic attraction force. As an example, the couplings 241-1 and 241-2 can include magnets and the couplings 211-1 and 211-2 can include magnets where the magnets can provide a magnetic attraction force.

As an example, the keyboard unit 210 and the keyboard dock 230 can include mating interfaces, which may be associated with couplings 211-1, 211-2, 241-1 and 241-2 and/or other portions. In such an example, electrical contacts may be made for transfer of power and/or data. As an example, an interface may include resilient contacts such as, for example, spring-loaded pogo pins.

Figure 3A:
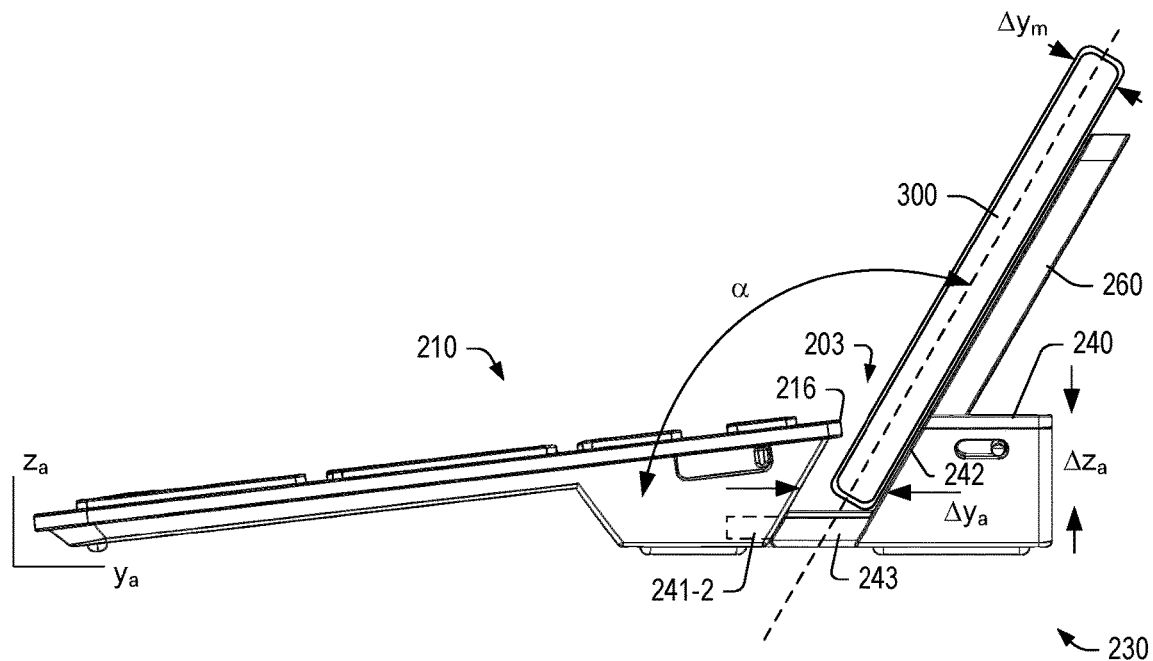
FIG. 3A and FIG. 3B are side views of examples of the keyboard assembly.
Figure 3B:
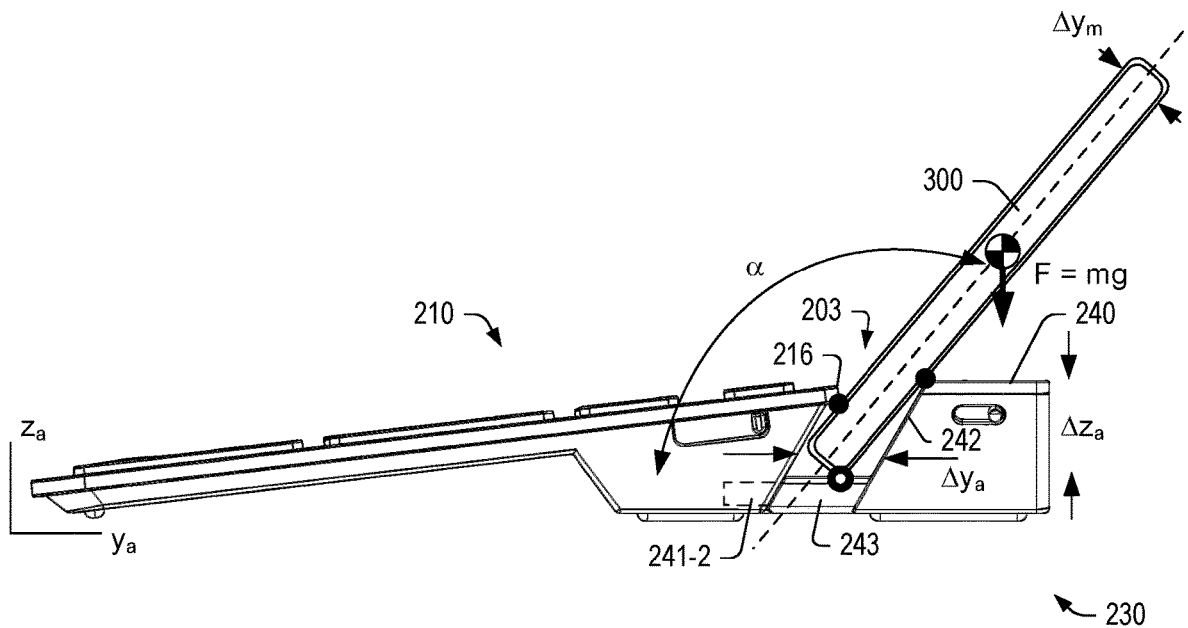

FIG. 3A and FIG. 3B show a side view of the keyboard assembly 200 of FIG. 2 in an assembled configuration where a mobile device 300 is positioned in a slot 203 formed by the keyboard unit 210 and the keyboard dock 230 where the example of FIG. 3A includes the charger extension 360 and where the example of FIG. 3B may not include the charger extension 360 (e.g., the mobile device 300 may be positioned along the x-coordinate aligned with a charger extension or not).

As shown, the slot 203 can include a dimension $\Delta y_a$ that is sufficient for receipt of a portion of the mobile device 300, for example, consider a mobile device thickness $\Delta y_m$. As an example, the slot 203 can be defined in part by the front spacer 243 and/or a back surface 216 of the keyboard unit 210. As indicated in FIG. 3B, in absence of the charger extension 260, the slot 203 may be sufficient to support the mobile device 300 via contact between a portion of the mobile device 300 and the back surface 216 of the keyboard unit 210. With respect to the example of FIG. 3A, the mobile device 300 in the example of FIG. 3B may be tilted back at a slightly greater angle, a, where it is supported in a leveraged manner via the back surface 216 of the keyboard unit 210 (e.g., consider 120 degrees in FIG. 3A and 130 degrees in FIG. 3B). FIG. 3B shows solid circles as contact points between the mobile device 300 and the back surface 216 and the front surface 242 (e.g., at a top edge) and an open circle as a possible contact point between the mobile device 300 and the front spacer 243. As an example, an angle of the charger extension 260 may be fixed or adjustable.

As shown in FIG. 3B, the mobile device 300 may be supported in the slot 203 via its mass and gravity (see, e.g., $F=mg$). In such an example, a torque may be established such that force is applied by the mobile device 300 to the back surface 216 of the keyboard unit 210 and to the front surface 242 of the keyboard dock 230. As mentioned, the mobile device 300 may or may not contact the front spacer 243. In the example of FIG. 3B, the mobile device 300 is fully inserted such that it contacts the front spacer 243; noting that it may be pulled outwardly from the slot a bit such that it does not contact the front spacer 243 yet contacts the back surface 216 and the front surface 242 and is suitably, stably supported in the slot 203.

In the examples of FIG. 3A and FIG. 3B, a dimension $\Delta z_a$ can be a vertical depth of the slot 203 from an uppermost point to a point on the front spacer 243. As an example, the vertical depth may be less than 4 centimeters, less than 3.5 centimeters or less than 3 centimeters such that a majority portion of a display of a mobile device may be visible when the mobile device is in the slot 203. As to the charger extension 260, it may extend from a point on the front spacer 243 to a point above the slot 203 by a dimension of approximately 5 centimeters or more (e.g., consider 6 centimeters, 7 centimeters, 8 centimeters, etc.).

As an example, the back surface 216 of the keyboard unit 210 can be an elastomeric surface that may provide for increased friction with respect to a mobile device such as a glass display surface of a mobile device. In such an example, the back surface 216 may increase grip to help stabilize the mobile device and provide for reduced risk of damage and/or marring of the mobile device. As an example, the back surface 216 may be a back edge surface, which may be an elastomeric edge. As an example, the front surface 242 may be an elastomeric surface and/or may include an elastomeric edge. As an example, an elastomeric material may be utilized that is elastically deformable. For example, consider one or more polymeric materials that may include a natural rubber, a synthetic rubber, a blend of rubbers, etc.

Figure 4:
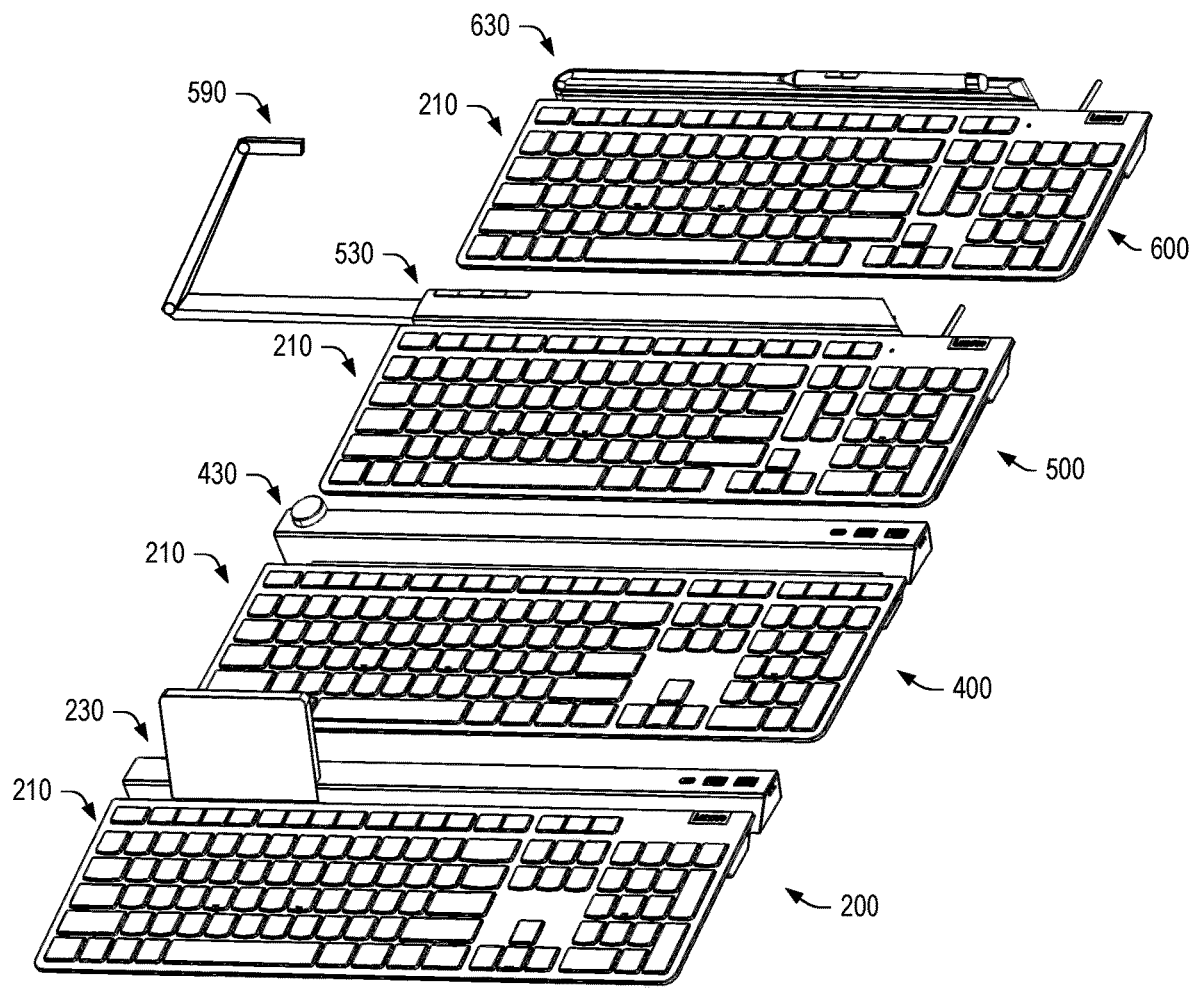
FIG. 4 is a series of perspective views of examples of keyboard assemblies.

FIG. 4 shows a series of perspective views of examples of keyboard assemblies 200, 400, 500 and 600. As an example, the keyboard unit 210 may be compatible with multiple, different keyboard docks 230, 430, 530 and 630. For example, a user may select a keyboard dock according to one or more features. Once paired with the keyboard unit 210, the selected keyboard dock (e.g., one of the keyboard docks 230, 430, 530 and 630 or another keyboard dock) and keyboard unit 210 can form an assembly that includes a slot such as, for example, the slot 203, which may support a mobile device such as, for example, a smartphone.

In the example of FIG. 4, the keyboard dock 530 can include an extendible arm 590, which may be deployable from a recess (e.g., a cavity, etc.) of the keyboard dock 530. In such an example, the extendible arm 590 may include one or more features such as, for example, consider a camera, a light, a microphone, a stylus holder. As shown, the extendible arm 590 may include one or more joints and/or may be telescoping. As an example, a keyboard dock may include one or more human input device features such as buttons, a touch-sensitive surface, a knob, etc. For example, consider a light switch, a camera switch, a microphone switch, etc. As an example, a light mounted on an arm may be utilized to illuminate a keyboard unit, for example, where the keyboard unit may be without its own illumination (e.g., without a light). While the example arm 590 is shown with the example keyboard dock 530, it may be part of one or more other types of keyboard docks (e.g., one or more of the keyboard docks 230, 430, 630, etc.).

Figure 5:
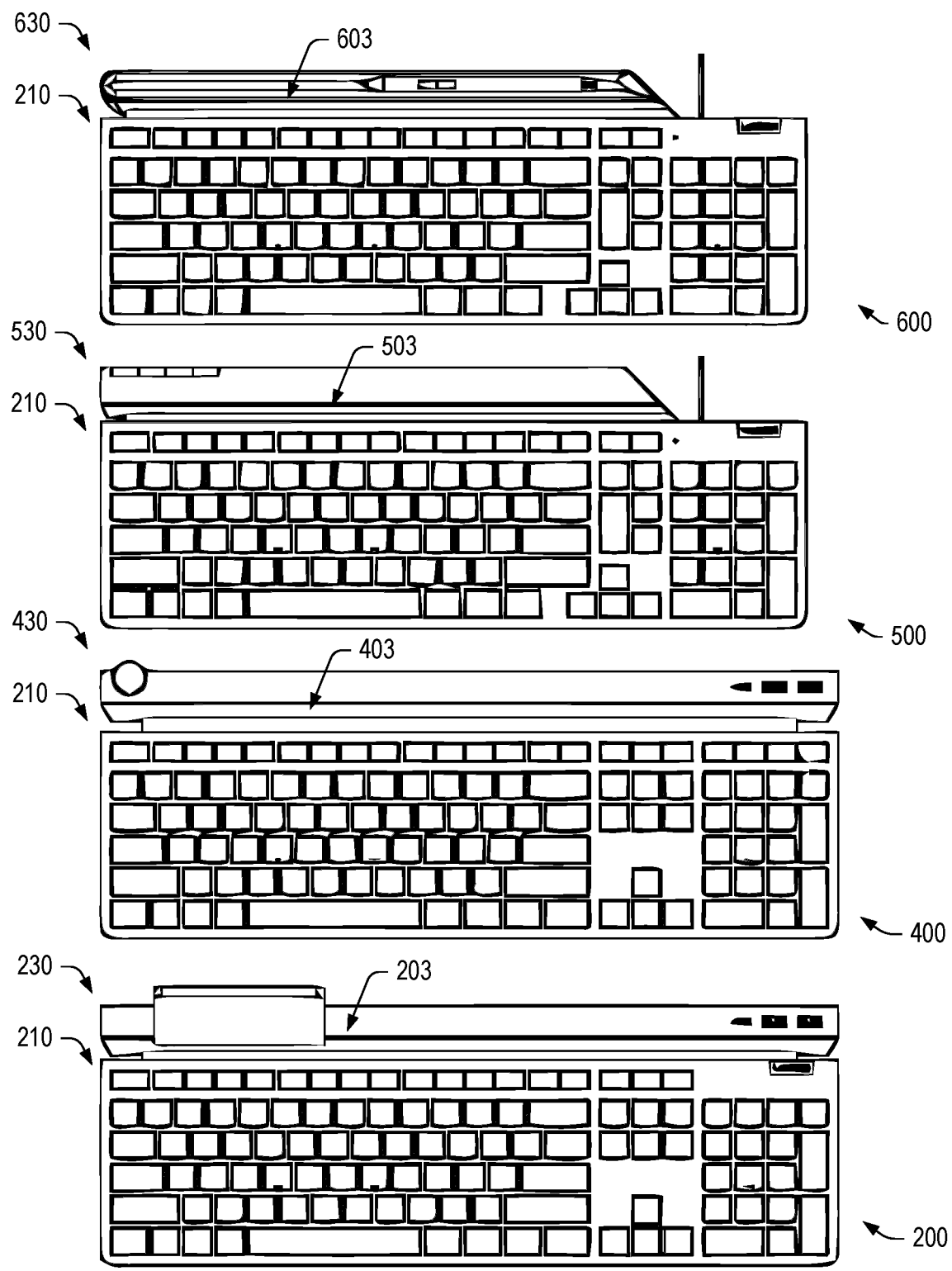
FIG. 5 is a series of top views of examples of keyboard assemblies.

FIG. 5 shows a series of top views of the examples of keyboard assemblies 200, 400, 500 and 600 where slots 203, 403, 503 and 603 are illustrated. In the example assemblies 200 and 400, the keyboard docks 230 and 430 are approximately the same length as the keyboard unit 210 along the x-dimension; whereas, in the example assemblies 500 and 600, the keyboard docks 530 and 630 are of a lesser length than the keyboard unit 210. In various examples, a cable may be provided for power and/or data transmission for at least part of an assembly (e.g., a keyboard unit, a keyboard dock, a keyboard unit and a keyboard dock, etc.). As an example, a keyboard dock can include a cable recess where a cable may be storable and deployable from the cable recess.

Figure 6:
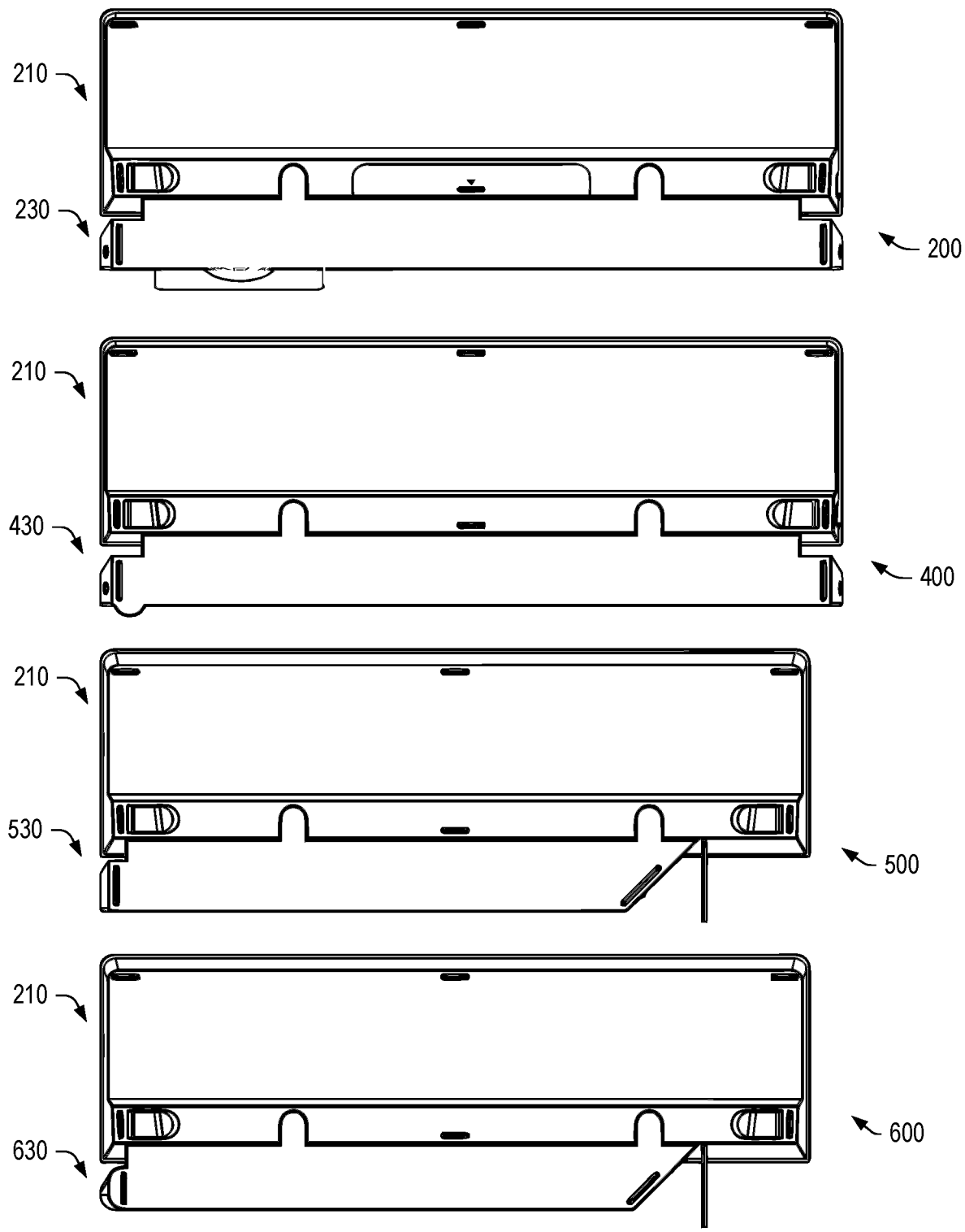
FIG. 6 is a series of bottom views of examples of keyboard assemblies.

FIG. 6 shows a series of bottom views of the examples of keyboard assemblies 200, 400, 500 and 600. As mentioned, the keyboard docks 530 and 630 may be of lesser length along the x-dimension than the keyboard docks 230 and 430 while still being compatible with the keyboard unit 210. As an example, the keyboard unit 210 may be available with a cable and/or without a cable. As an example, the keyboard unit 210 may have a removable cable. For example, consider a USB cable where the keyboard unit 210 includes a USB connector such as a female USB connector as a USB socket and/or, for example, consider a keyboard dock that may include a USB connector such as a male USB connector as a USB plug. As an example, the keyboard unit 210 and one or more of the keyboard docks 230, 430, 530 and 630 may include mating interfaces for transmission of power and/or data (e.g., mating USB plug/connector interfaces, pogo-pin interfaces, etc.).

Figure 7:
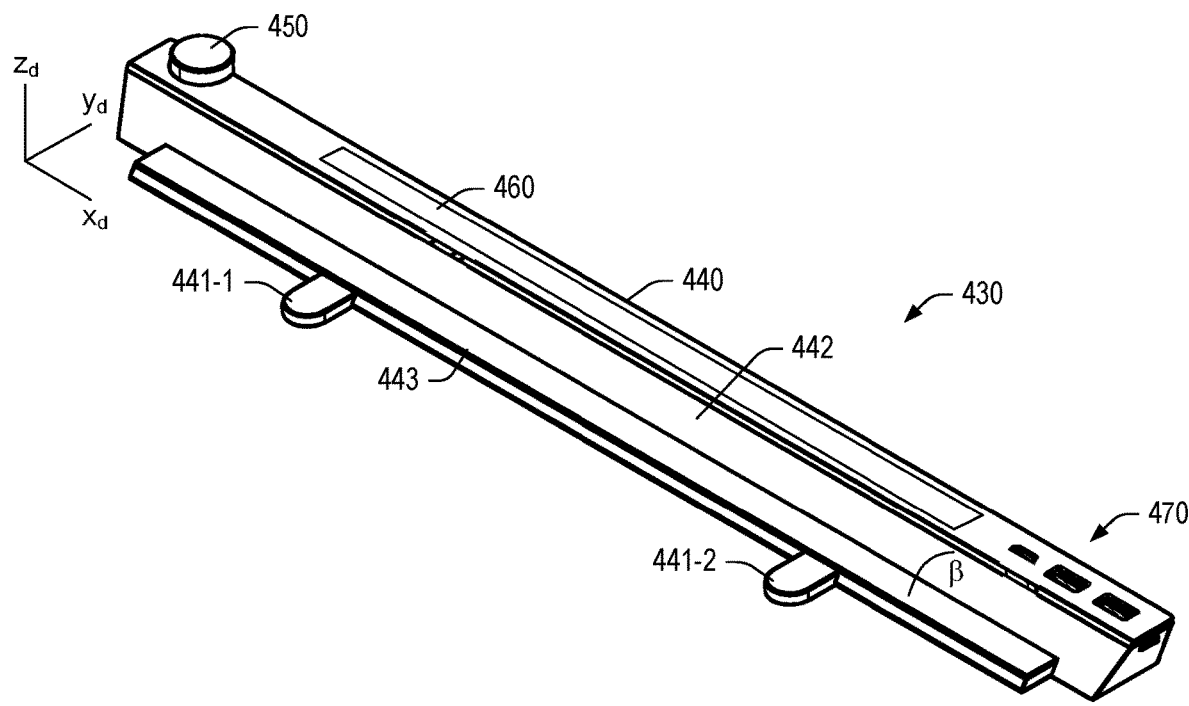
FIG. 7 is a perspective view of an example of a keyboard dock.

FIG. 7 shows a perspective view of the keyboard dock 430, which includes a housing 440, one or more keyboard couplings 441-1 and 441-2, a front surface 442, a front spacer 443 and a human input device 450. For example, the human input device 450 can include one or more wheels rotatable about an axis and may include a push feature, for example, to click or enter a selection with respect to menu items of a graphical user interface, a position on a display, etc. In the example of FIG. 7, the keyboard dock 430 may include a display 460 such as a strip display that can render one or more menu items that may be selectable via input received by the human input device 450. For example, the keyboard dock 430 can include display circuitry that is operatively coupled to input circuitry such that input received via the human input device 450 can select a rendered item to the display 460, alter rendering to the display 460, etc.

As an example, the display 460 can be a touch-sensitive display with touch-sensitive circuitry where a user may be able to extend a finger or fingers beyond an end of a keyboard unit for touch input via the touch-sensitive circuitry of the display 460. As an example, the human input device 450 may be a menu selector that can select a menu for rendering via the display 460 where a user may then utilize the display 460 for touch input. As an example, the keyboard dock 430 may be utilized with a keyboard unit as an assembly where the assembly can be in communication with a device via wireless communication circuitry. For example, consider the keyboard dock 430 making a keyboard unit a smart remote control for a television, a cable box, an Internet modem, etc. In such an example, control options may be rendered to the display 460 to help guide a user in remote control of a device. For example, consider channel selection for a television, content searching where search terms may be input via a keyboard unit, etc. As an example, such an assembly may be coupled to multiple different devices where the human input device 450 may be utilized to select one of the multiple different devices for paired interaction. In such an example, where the display 460 is included, it may provide information as to pairing, device selected, interaction options, etc.

In the example of FIG. 7, the keyboard dock 430 includes one or more ports 470, which may include one or more serial ports for transmission of power and/or data.

In the example of FIG. 7, the front surface 442 can include a fixed angle of β or it may include one or more different angles of β. For example, consider the front surface 442 varying within a range from approximately 170 degrees to approximately 90 degrees. In such an example, a user may slide a mobile device along the slot 403 (see, e.g., FIG. 5) to achieve a desired angle of the mobile device. In the example of FIG. 7, the front surface 442 is shown with a decreasing angle of β in moving from right to left (e.g., along the x-dimension).

Figure 8:
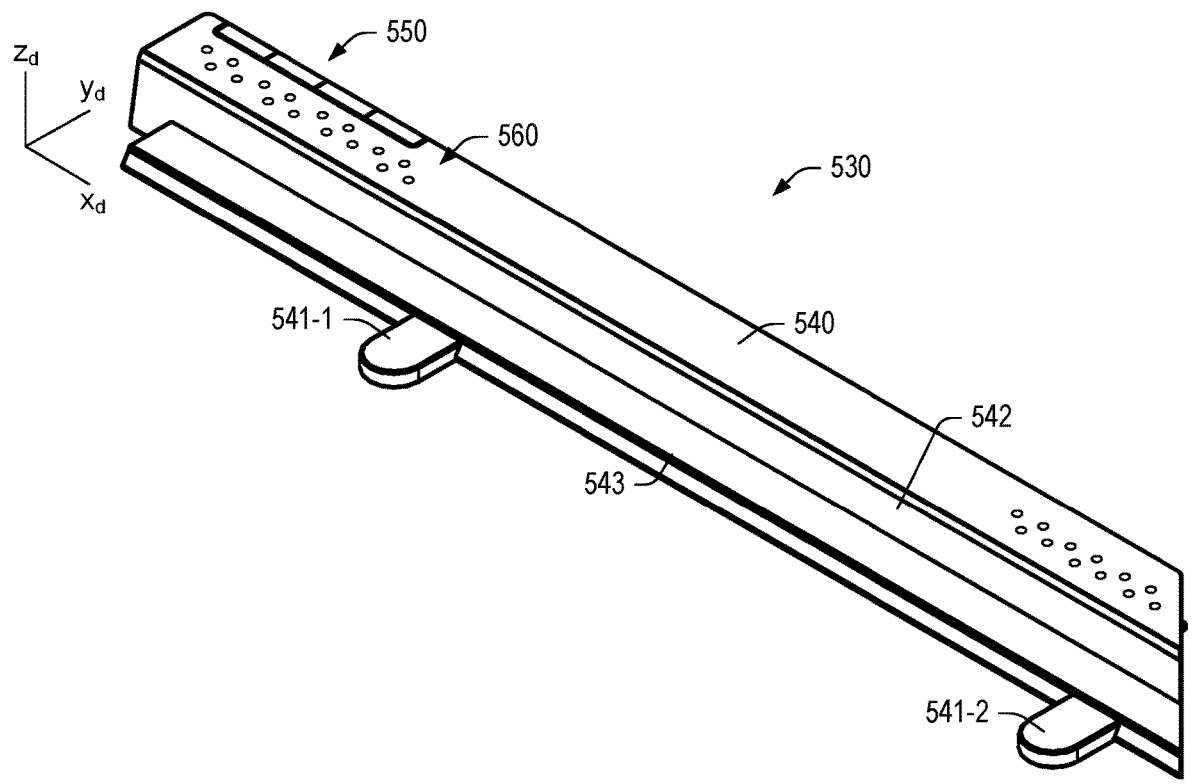
FIG. 8 is a perspective view of an example of a keyboard dock.

FIG. 8 shows a perspective view of the keyboard dock 530, which includes a housing 540, one or more keyboard couplings 541-1 and 541-2, a front surface 542, a front spacer 543 and buttons 550. In the example of FIG. 8, the keyboard dock 530 may include audio circuitry 560, for example, consider audio speaker and/or microphone circuitry such that the keyboard dock 530 can be a wired and/or a wireless speaker and/or microphone. Various types of display assemblies may include a speaker or may be speaker-less. Where a user desires audio features, a keyboard dock such as the keyboard dock 530 may be utilized. As an example, where a user utilizes an assembly such as the assembly 500, a mobile device may be positioned in the slot 503 and the audio circuitry 560 of the keyboard dock 530 utilized, for example, for phone calls, etc. In such an example, the user may be able to position the mobile device in the slot 503 with the microphone and/or speakers in the slot 503 where the audio circuitry 560 is utilized rather than the microphone and/or speakers of the mobile device.

Figure 9:
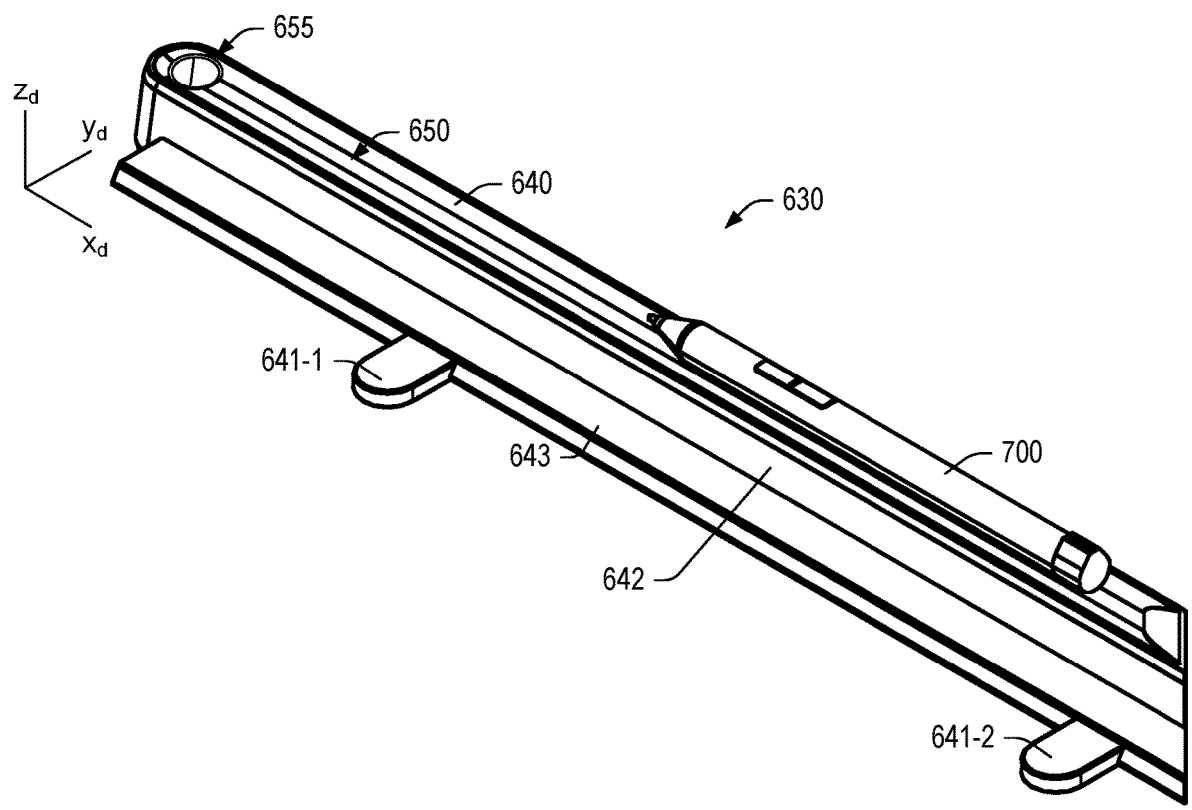
FIG. 9 is a perspective view of an example of a keyboard dock.

FIG. 9 shows a perspective view of the keyboard dock 630, which includes a housing 640, one or more keyboard couplings 641-1 and 641-2, a front surface 642, a front spacer 643 and a stylus recess 650 that can receive a stylus 700, for example, in a substantially horizontal position. As an example, the housing 640 can include a stylus support hole 655 that can receive the stylus 700 (e.g., or another stylus) in an upright position. As an example, the keyboard dock 630 can include one or more charging features for charging a rechargeable battery of the stylus 700. For example, consider contact-based and/or contactless (e.g., wireless) charging circuitry.

As an example, a keyboard dock may be a keyboard accessory suitable for connection with a keyboard unit. Such an accessory can aim to enhance user experience while minimizing clutter and providing a slot for a positioning of a mobile device or mobile devices.

As mentioned, connection may be via magnetic attraction force to allow a keyboard accessory or accessories to magnetically attach to a keyboard unit, for example, to provide a phone and/or tablet slot, which may allow for increased productivity in one or more workflows.

As explained, a keyboard unit can include a feature or features for connection with a keyboard dock, which may be considered a keyboard accessory. For example, a feature can be a ferromagnetic surface, a ferromagnetic socket, etc., that can be attracted to a magnet. As another example, a feature may be an interference fit feature that can connect to a feature of a keyboard dock via an interference fit (e.g., a press-fit). As an example, features may be lock-and-key or key and keyway features. For example, as a keyboard unit may be of a particular mass with rubber feet, etc., to maintain stability, such a keyboard unit may include one or more receptacles on a bottom side that can be positioned over one or more corresponding extensions of a keyboard dock to connect the keyboard unit and the keyboard dock.

Figure 10:
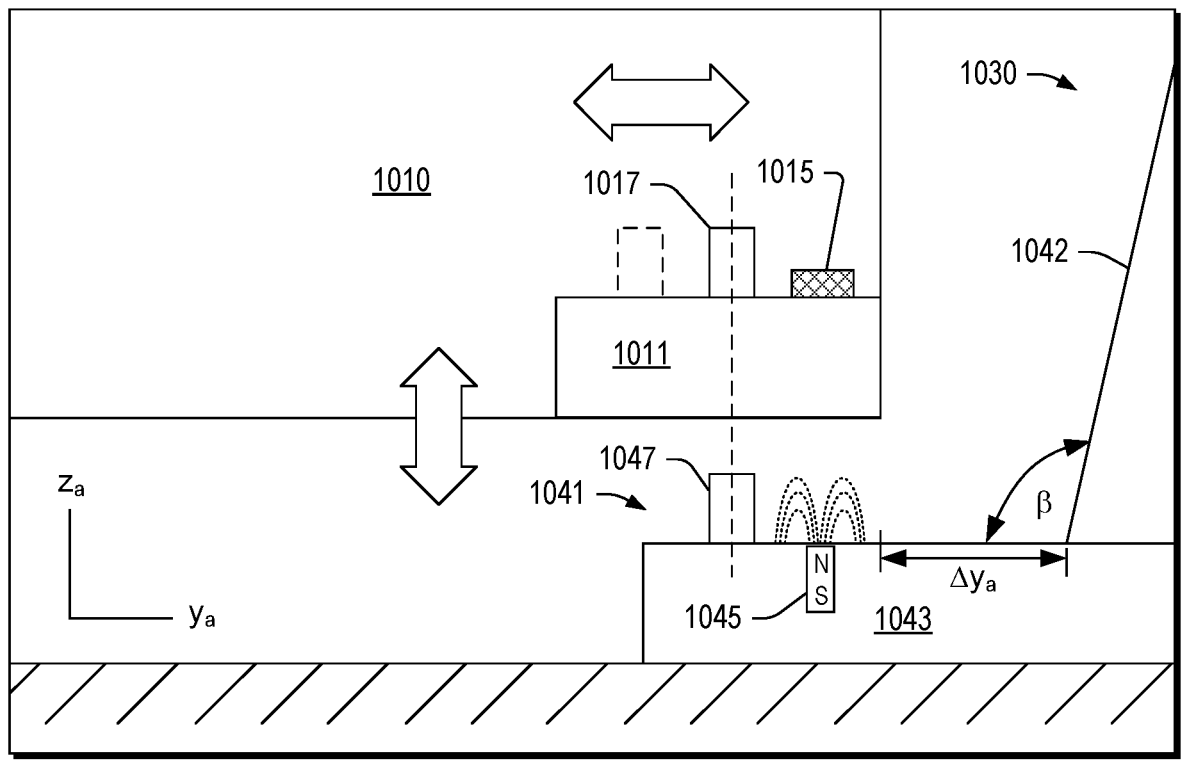
FIG. 10 is a view of an example of a portion of a keyboard assembly.

FIG. 10 shows an example of a keyboard unit 1010 with a keyboard dock coupling 1011 and a keyboard dock 1030 with a coupling 1041, a front surface 1042 and a front spacer 1043. As shown, one or more types of couplings may be utilized to connect the keyboard unit 1010 and the keyboard dock 1030. For example, consider a magnet 1045 and a ferromagnetic material 1015 such that a magnetic attraction force can be utilized to connect the keyboard unit 1010 and the keyboard dock 1030. Alternatively or additionally, a peg socket 1017 or peg sockets, which may provide for selection of a desired slot dimension, and a peg 1047 can be utilized to connect the keyboard unit 1010 and the keyboard dock 1030. As an example, consider selection of one of two slot dimensions using one or more magnets, one or more pieces of ferromagnetic material, one or more peg sockets, etc. In the example of FIG. 10, an alignment for selection of a larger of two slot dimensions is shown. In such an example, a user may select a slot dimension (see, e.g., the dimension $\Delta y_a$ in FIG. 3A and FIG. 3B) for a smaller mobile device (e.g., a smartphone, etc.) and may select a different slot dimension for a larger mobile device (e.g., a tablet, etc.). As an example, a slot dimension may be selected via one or more adjustment mechanisms to provide a desirable angle for viewing a mobile device. For example, consider the angle α in FIG. 3B where a greater angle α may be provided where the slot dimension is increased and a smaller angle α may be provided when the slot dimension is decreased.

In the example of FIG. 10, the keyboard unit 1010 and the keyboard dock 1030 may connect via placing the keyboard unit 1010 over the coupling 1041 of the keyboard dock 1030. Such an approach may utilize a magnet, a ferromagnetic material, an interference fit, a key and keyway, etc. As an example, a mass of the keyboard unit 1010 and gravity may help to maintain connection. While the example of FIG. 10 shows optional multiple sockets for selection of a slot dimension, multiple slot dimensions may be provided via utilization of multiple magnets and/or multiple pieces of ferromagnetic materials.

In the example of FIG. 10, the one or more peg sockets 1017 of the coupling 1011 and/or the peg 1047 of the keyboard dock 1030 may be reversed such that the keyboard unit 1010 includes a peg and the keyboard dock 1030 includes one or more sockets.

As an example, a keyboard unit and/or a keyboard dock can include feet, which may be elastomeric (e.g., rubber, etc.). As an example, a keyboard unit and/or a keyboard dock can include extendible feet, for example, to provide for elevation of the keyboard of the keyboard unit to increase its slope. Where a keyboard unit includes extendible feet, a connection force may be sufficient to suspend the keyboard dock with or without a mobile device set in a slot formed by the keyboard dock and the keyboard unit. For example, consider a mobile device with a mass less than approximately 1 kilogram (e.g., a magnetic attraction force sufficient to support a mass of approximately 1 kilogram or less plus the mass of the keyboard dock).

As mentioned, a keyboard unit and a keyboard dock may be electrically connected for transmission of power and/or data. For example, consider mating peg and socket interfaces, pogo pin interfaces, USB connectors, etc.

As an example, a keyboard dock can include a serial bus interface as a port and/or as a plug where the serial bus interface can provide for transmission of power and/or data. As an example, a keyboard unit and a keyboard dock may provide for transmission of power and/or data from the keyboard unit to the keyboard dock and/or from the keyboard dock to the keyboard unit. As an example, a keyboard unit and/or a keyboard dock can include a power cable and/or one or more batteries.

As an example, a keyboard unit may be a relatively low feature, low cost unit where one or more features may be added via use of a keyboard dock. As explained, a keyboard dock may include a coupling such as a magnetic coupling with a magnet or magnets (e.g., permanent magnets). When attached to a keyboard unit, a slot can be created allowing for a user to position a phone and/or tablet for easier visibility of information to increase workflow and productivity.

Figure 11:
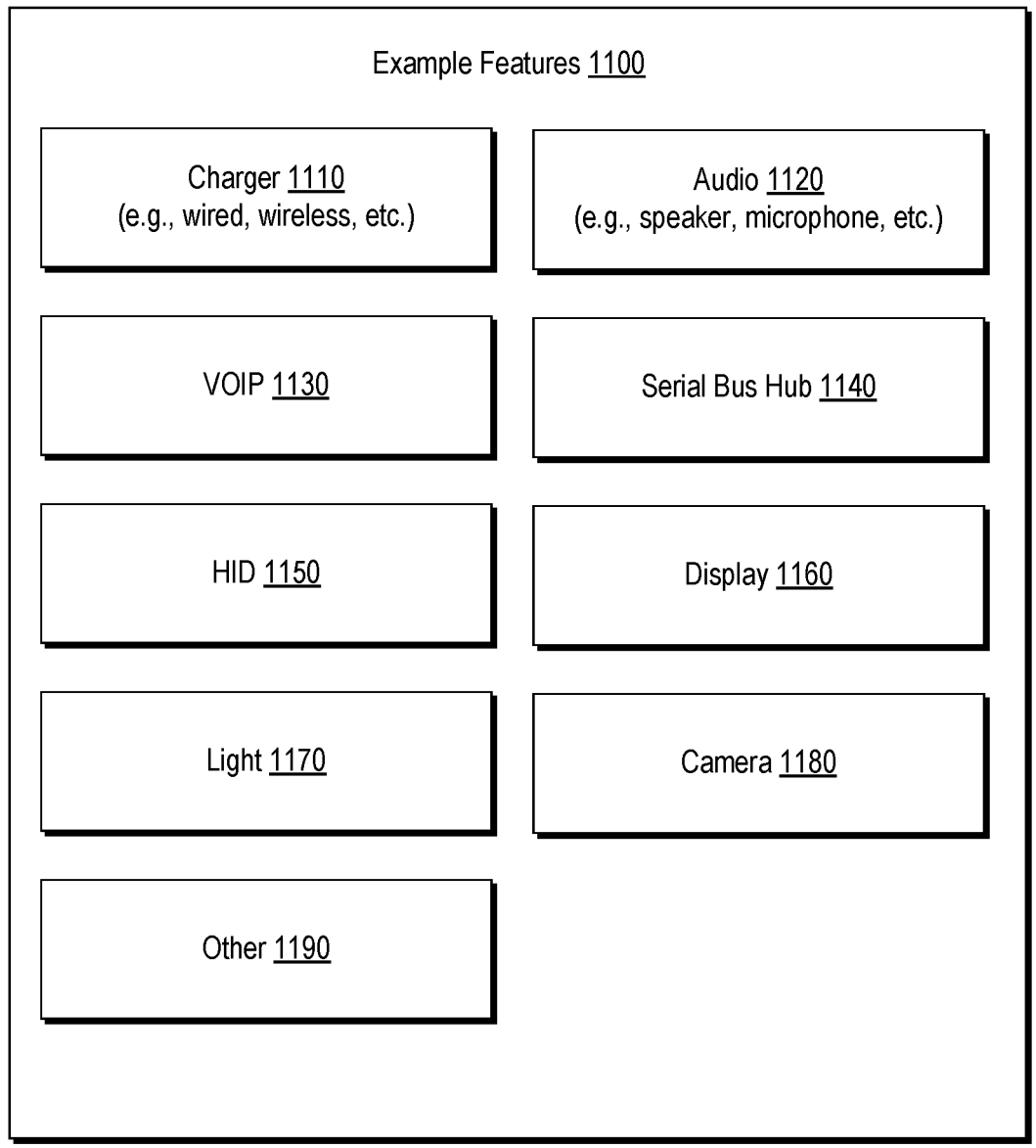
FIG. 11 is a block diagram of examples of features of a keyboard dock.

FIG. 11 shows some examples of features 1100 of a keyboard dock, which can include a charger 1110, audio 1120, voice over Internet protocol (VOIP) 1130, a serial bus hub 1140, a human input device (HID) 1150, a display 1160, a light 1170, a camera 1180 and/or one or more other features 1190.

As an example, a light may be one or more of a beauty light, a reading light, a keyboard illumination light, etc. For example, consider a LED or LEDs on an arm that can be folded down or unfolded and extended. As an example, a camera may be positioned on an arm, optionally with or without a light and/or a microphone. As an example, a keyboard dock can include an extendible arm or extendible arms that may provide for positioning of an arm mounted light, an arm mounted camera, an arm mounted microphone, a stylus holder, etc. (see, e.g., the example arm 590 of FIG. 4). As an example, a keyboard dock may include a recess (e.g., a cavity, etc.) for storing an extendible arm. For example, a user may deploy an arm from a keyboard dock with one or more circuitry features, a stylus mount, etc. As an example, an arm may be hinged and/or may include a swivel joint, a ball joint, etc. and/or may include a telescoping arrangement of arm pieces. As an example, an arm may be deployable from a top surface, a back surface or an end of a keyboard dock. For example, consider an arm that can extend outwardly from a left end or a right end of a keyboard dock.

As an example, a keyboard dock may include one or more of the features of FIG. 11. As an example, audio capabilities can include BLUETOOTH audio (e.g., BLUETOOTH speaker(s)), VOIP capabilities can include VOIP controls (e.g., for making calls, receiving calls, call controls such as mute, volume, terminate, etc.), a serial bus hub may be or include a USB hub, a display may be a OLED display, a secondary screen, a touch screen, etc., a HID may be or include a mouse, a touchpad, etc., another feature may be a game feature (e.g., a game or gaming keyboard dock, etc.), etc.

As an example, a keyboard dock can include a keyboard coupling; a front surface; and a front spacer that extends outwardly from the front surface, where the front spacer and the front surface form a mobile device support. In such an example, the front surface can be sloped, for example, consider the front surface being sloped at an angle greater than 90 degrees with respect to the front spacer. In such an example, the front surface may be sloped at an angle less than 160 degrees with respect to the front spacer.

As an example, a keyboard dock can include a keyboard coupling that extends outwardly from a front spacer. As an example, a front spacer of a keyboard dock may extend outwardly from a front surface of the keyboard dock by at least 1 centimeter. In such an example, the front spacer may extend outwardly from the front surface by less than 6 centimeters.

As an example, a keyboard dock may be passive without circuitry or it may include circuitry. As to a passive keyboard dock, it may be coupled with a keyboard unit to form a slot that can provide for positioning of a mobile device such as a tablet, a cell phone, etc.

As an example, a keyboard dock can include circuitry such as charger circuitry. In such an example, a front surface of the keyboard dock can include a target region for the charger circuitry. For example, consider a charger extension that forms part of the front surface where the charger extension includes the target region, which may be marked by one or more indicia, be aligned via one or more magnets, be aligned via one or more guides, etc.

As an example, a keyboard dock can include serial bus port circuitry. For example, consider a keyboard dock that includes one or more USB sockets and/or plugs.

As an example, a keyboard dock can include input device circuitry. For example, consider a rotatable knob operatively coupled to input device circuitry. In such an example, the rotatable knob may be a human input device (HID) that can be utilized with a display and/or computing device for making menu selections, menu item selections, etc. As an example, a keyboard dock can include at least one button operatively coupled to input device circuitry.

As an example, a keyboard dock can include a stylus recess. For example, consider a stylus recess that can seat a stylus in a horizontal position and/or a stylus recess that can seat a stylus in an upright and/or angled position. As an example, a keyboard dock can include charging circuitry (e.g., charger circuitry) that can charge a rechargeable battery of an accessory. For example, consider a stylus as an accessory that can be seated in a recess and charged.

As an example, an assembly can include a keyboard dock that includes a keyboard unit coupling, a front surface, and a front spacer that extends outwardly from the front surface; and a keyboard unit that includes a keyboard dock coupling and a back surface, where the keyboard unit coupling detachably mates with the keyboard dock coupling to form a mobile device slot defined by the front spacer and the front surface of the keyboard dock and the back surface of the keyboard unit. In such an example, the mobile device slot can be greater than 1 centimeter deep and, for example, less than 6 centimeters deep.

As an example, an assembly may include multiple keyboard docks where, for example, a user may select a first keyboard dock for various scenarios and/or tasks and then select a second, different keyboard dock (e.g., with one or more different features) for various scenarios and/or tasks.

As an example, a keyboard unit coupling can include an extension and a keyboard dock coupling can include a socket that receives at least a portion of the extension. As an example, a keyboard dock coupling can include an extension and a keyboard unit coupling can include a socket that receives at least a portion of the extension.

As an example, an assembly can include at least one magnet where a keyboard dock coupling and a keyboard unit coupling mate via a magnetic attraction force generated by the at least one magnet.

As an example, a keyboard dock and/or a keyboard unit can include a power connector and/or a power cable. As an example, a keyboard unit can include a power connector that mates with a power connector of a keyboard dock. As an example, a power connector and/or a power cable may be a power and/or data connector and/or a power and/or data cable.

As an example, an assembly can include at least one battery. For example, a keyboard dock and/or a keyboard unit can include at least one battery.

As an example, an assembly can include wireless communication circuitry. For example, a keyboard dock and/or a keyboard unit can include wireless communication circuitry. As an example, a keyboard dock can include circuitry operatively coupled to wireless communication circuitry and a keyboard unit can include circuitry operatively coupled to the wireless communication circuitry.

As an example, an assembly can include at least one battery and wireless communication circuitry powered by the at least one battery, where a keyboard dock of the assembly includes circuitry operatively coupled to the wireless communication circuitry and where a keyboard unit of the assembly includes circuitry operatively coupled to the wireless communication circuitry.

As an example, an assembly can include at least one magnet where physical coupling of a keyboard dock and a keyboard unit is via a magnetic attraction force generated by the at least one magnet.

As an example, a keyboard dock can include one or more types of circuitry. For example, consider one or more of a speaker, a microphone, a camera, a light, a HID, a serial bus hub, an OLED display, wireless circuitry etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 12:
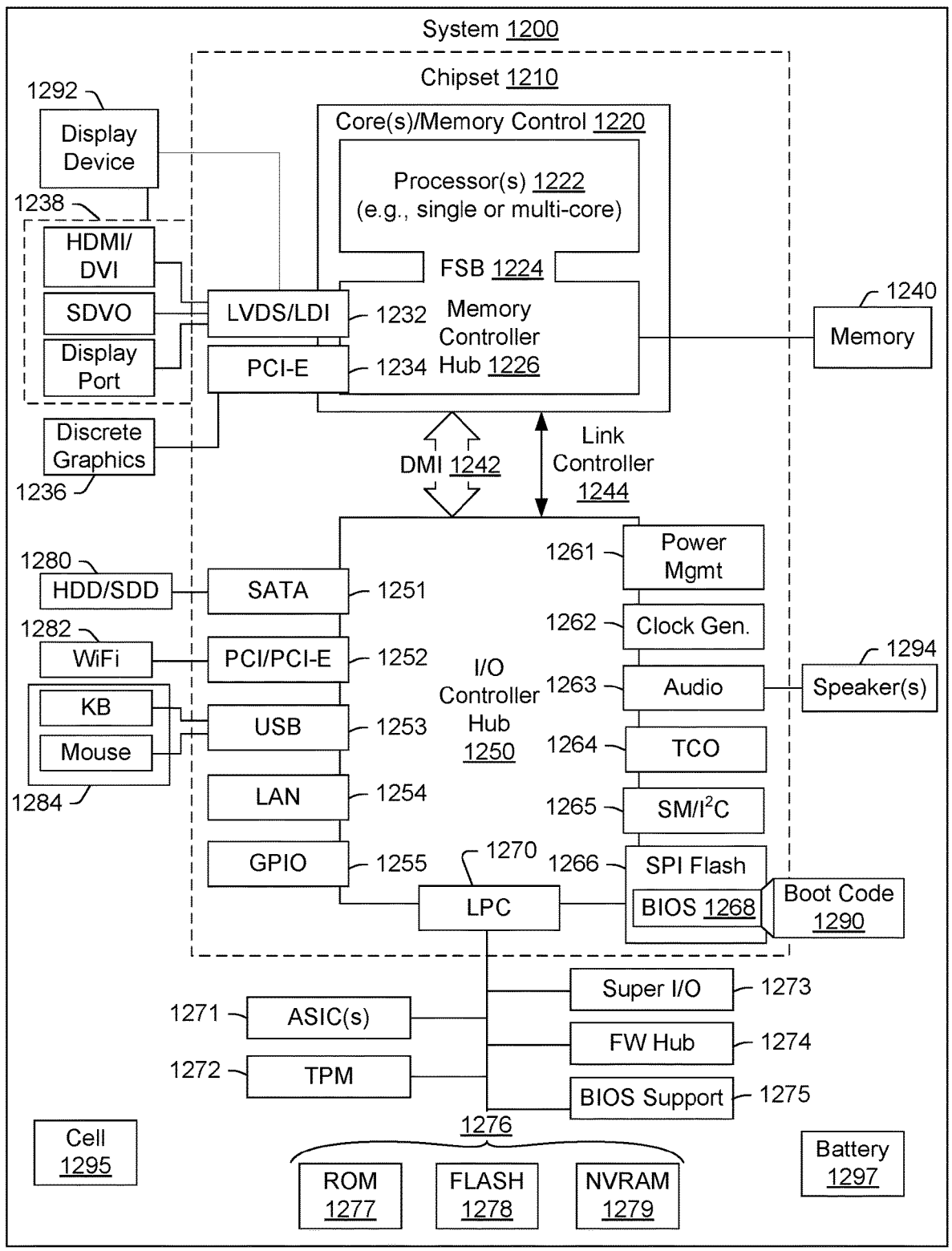
FIG. 12 is a diagram of an example of a system.

While various examples of circuits or circuitry have been discussed, FIG. 12 depicts a block diagram of an illustrative computer system 1200. The system 1200 may be a computer system sold by Lenovo (US) Inc. of Morrisville, N.C. (e.g., a THINKSTATION® system, etc.); however, as apparent from the description herein, a satellite, a base, a display, a dock, a keyboard, a computing device, a server or other machine may include one or more features and/or other features of the system 1200.

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 12, the system 1200 includes a so-called chipset 1210. A chipset refers to a group of integrated circuits, or chips, that are designed to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. As shown, the system 1200 may include one or more batteries 1297 and, for example, battery management circuitry.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:
   a keyboard dock that comprises a keyboard unit coupling, a front surface, and a front spacer that extends outwardly from the front surface;
   a keyboard unit that comprises a keyboard dock coupling and a back surface, wherein the keyboard unit coupling detachably mates with the keyboard dock coupling to form a mobile device slot defined by the front spacer and the front surface of the keyboard dock and the back surface of the keyboard unit; and
   at least one magnet wherein the keyboard dock coupling and the keyboard unit coupling mate via a magnetic attraction force generated by the at least one magnet.

2. The assembly of claim 1, wherein the mobile device slot is greater than 1 centimeter deep and less than 6 centimeters deep.

3. The assembly of claim 1, wherein the keyboard dock is a first keyboard dock and comprising a second, different keyboard dock.

4. The assembly of claim 1, wherein the keyboard unit coupling comprises an extension and wherein the keyboard dock coupling comprises a socket that receives at least a portion of the extension.

5. The assembly of claim 1, wherein the keyboard dock coupling comprises an extension and wherein the keyboard unit coupling comprises a socket that receives at least a portion of the extension.

6. The assembly of claim 1, comprising at least one battery and wireless communication circuitry powered by the at least one battery, wherein the keyboard dock comprises circuitry operatively coupled to the wireless communication circuitry and wherein the keyboard unit comprises circuitry operatively coupled to the wireless communication circuitry.

7. The assembly of claim 1, wherein a slot dimension of the mobile device slot, defined between the front surface of the keyboard dock and the back surface of the keyboard unit, is adjustable via an adjustment mechanism, wherein a decrease in the slot dimension stands a mobile device in the mobile device slot at a more vertical angle, and wherein an increase in the slot dimension stands a mobile device in the mobile device slot at a less vertical angle.

8. The assembly of claim 7, wherein the adjustment mechanism utilizes one or more of: at least one of the at least one magnet; at least one piece of ferromagnetic material; and at least peg socket.

9. The assembly of claim 1, wherein the front surface of the keyboard dock is sloped.

10. The assembly of claim 9, wherein the front surface is sloped at an angle greater than 90 degrees and less than 160 degrees with respect to the front spacer.

11. The assembly of claim 1, wherein the front spacer extends outwardly from the front surface by at least 1 centimeter and by less than 6 centimeters.

12. The assembly of claim 1, wherein the keyboard dock comprises circuitry.

13. The assembly of claim 12, wherein the circuitry comprises charger circuitry.

14. The assembly of claim 13, wherein the front surface comprises a target region for the charger circuitry.

15. The assembly of claim 12, wherein the circuitry comprises serial bus port circuitry.

16. The keyboard dock of claim 12, wherein the circuitry comprises input device circuitry.

17. The assembly of claim 16, comprising a rotatable knob operatively coupled to the input device circuitry.

18. The assembly of claim 1, wherein the keyboard dock comprises a stylus recess.

\* \* \* \* \*